(12) United States Patent
Yu et al.

(10) Patent No.: US 11,829,625 B2
(45) Date of Patent: Nov. 28, 2023

(54) SLICE MEMORY CONTROL

(71) Applicant: EMC IP Holding Company LLC, Hopkinton, MA (US)

(72) Inventors: Rong Yu, West Roxbury, MA (US); Jingtong Liu, Natick, MA (US); Peng Wu, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/859,183

(22) Filed: Apr. 27, 2020

(65) Prior Publication Data

US 2021/0334026 A1 Oct. 28, 2021

(51) Int. Cl.
*G06F 3/06* (2006.01)

(52) U.S. Cl.
CPC .......... *G06F 3/0644* (2013.01); *G06F 3/0604* (2013.01); *G06F 3/0653* (2013.01); *G06F 3/0656* (2013.01); *G06F 3/0659* (2013.01); *G06F 3/0673* (2013.01)

(58) Field of Classification Search
CPC ..... G06F 3/0604; G06F 3/0673; G06F 3/0659
See application file for complete search history.

(56) References Cited

U.S. PATENT DOCUMENTS

| | | | |
|---|---|---|---|
| 2016/0154750 A1* | 6/2016 | Park | G06F 3/0671 711/153 |
| 2016/0364269 A1* | 12/2016 | Wang | H04L 67/1097 |
| 2017/0177221 A1* | 6/2017 | Trehan | H04L 67/61 |
| 2018/0024743 A1* | 1/2018 | Herman | G06F 3/0659 710/316 |
| 2019/0065078 A1* | 2/2019 | Yerfule | G06F 3/0685 |
| 2019/0187894 A1* | 6/2019 | Benisty | G06F 13/4282 |
| 2019/0205031 A1* | 7/2019 | Shalev | G06F 3/0605 |
| 2021/0042051 A1* | 2/2021 | Ito | G06F 3/0659 |

* cited by examiner

*Primary Examiner* — Edward J Dudek, Jr.
(74) *Attorney, Agent, or Firm* — Krishnendu Gupta; Nikhil Patel

(57) ABSTRACT

Embodiments of the present disclosure relate to managing communications between slices on a storage device engine. Shared slice memory of a storage device engine is provisioned for use by each slice of the storage device engine. The shared slice memory is a portion of total storage device engine memory. Each slice's access to the shared memory portion is controlled.

20 Claims, 6 Drawing Sheets

SLICE MEMORY CONTROL

BACKGROUND

Storage device engines are devices that control storage systems. Such controllers can comprise a CPU (central processing unit), a cache memory, and a connection interface with network and memory devices. In general, the role of storage device engines is to perform processing tasks in an efficient and stable manner. For example, controllers can manage requests for memory for storage systems. Specifically, storage device engines can manage memory access requests of each device of a storage system by directing the requests to memory assigned to each device.

SUMMARY

One or more aspects of the present disclosure relate to managing communications between slices on a storage device engine. Shared slice memory of a storage device engine is provisioned for use by each slice of the storage device engine. The shared slice memory is a portion of total storage device engine memory. Each slice's access to the shared memory portion is controlled.

In embodiments, local slice memory portions of the total storage device engine memory can be provisioned for each slice.

In embodiments, each local slice memory portion can be assigned to a distinct slice of the storage device engine.

In embodiments, one or more shared queues can be established from the shared slice memory.

In embodiments, each shared queue can be configured to buffer memory access requests from each slice.

In embodiments, each shared queue can be associated with one or more operation types.

In embodiments, a shared memory index can be configured for each shared queue.

In embodiments, an index element in the shared memory index can be established to reference a buffer location corresponding to the shared queue for which the shared memory index is established.

In embodiments, a state of each shared memory index can be monitored. Each memory access request can be directed to a shared queue based on one or more of the states of each shared memory index and an operation type of the memory access request. Further, each memory access request can be buffered in the shared queue to which each memory access request is directed.

In embodiments, the states of each shared memory index to which each memory access request is directed can be updated. The states of each shared memory index can be provided to each slice.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
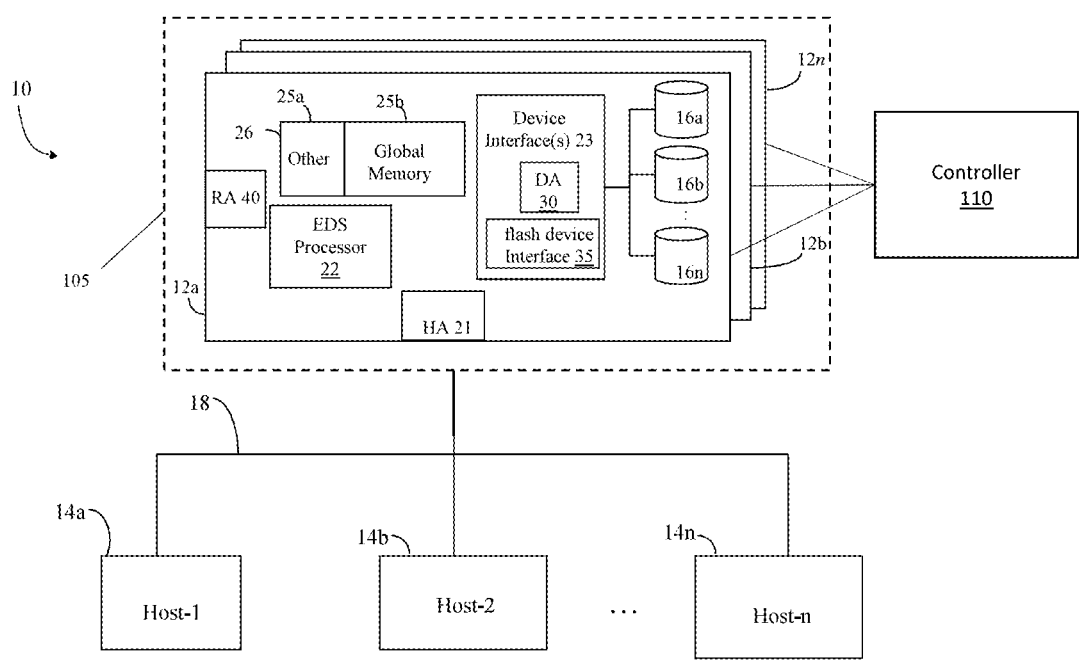
FIG. 1 is a block diagram of a storage system in accordance with example embodiments disclosed herein.

Referring to FIG. 1, an example system 10 includes data storage device 105. In embodiments, the storage device 105 can include one or more engines 12*a-n*. The engines 12*a-n* can include one or more slice elements (e.g., slice element 205 of FIG. 2). configured to provide storage device services. The slice elements 205 can represent one or more of the storage device components described below. The engines 12*a-n* can include one or more storage device boards (e.g., boards 130*a-b* and 135*a-b*). Each board can include memory (e.g., memory 200 of FIG. 2A) provisioned into shared memory and local memory components as described in greater detail herein. slices (e.g., the storage device components described herein)

In embodiments, each of the engines can be communicatively coupled to a slice controller 110. The slice controller 110 can include hardware circuitry and/or software elements configured to manage communications and access to shared memory as described in greater detail herein. Although the slice controller 110 is depicted as existing external to the device 105, it should be noted that a slice controller 110 can exist within the device 105. Accordingly, the slice controller 110 can communicate with the data storage device 105 using any one of a variety of communication connections. The testing device 15 is described in greater detail in the following paragraphs.

The device 105 is connected to host systems 14*a-n* through communication medium 18. In embodiments, the hosts 14*a-n* can access the data storage device 105, for example, to perform input/output (I/O) operations or data requests. The communication medium 18 can be any one or more of a variety of networks or other type of communication connections as known to those skilled in the art. In embodiments, the communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the hosts 14*a-n* can access and communicate with the data storage device 105. The hosts 14*a-n* can also communicate with other components included in the system 10 via the communication medium 18.

The hosts 14*a-n* and the data storage device 105 can be connected to the communication medium 18 by any one of a variety of connections as can be provided and supported in accordance with the type of communication medium 18. The processors included in the hosts 14*a-n* can be any one of a variety of proprietary or commercially available single or multi-processor system, such as an Intel-based processor, or other type of commercially available processor able to support traffic in accordance with each embodiment and application.

It should be noted that the examples of the hardware and software that can be included in the data storage device 105 are described herein in more detail and can vary with each embodiment. Each of the hosts 14*a-n* and the data storage device 105 can all be located at the same physical site or can be in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-n and the data storage device 105 can be connected to the communication medium can pass through other communication devices, such switching equipment that can exist such as a phone line, a repeater, a multiplexer or even a satellite.

Each of the hosts 14a-n can perform different types of data operations in accordance with different types of tasks. In embodiments, any one of the hosts 14a-n and/or testing device 15 can issue a data request to the data storage device 105 to perform a data operation. For example, an application executing on one of the hosts 14a-n and/or the testing device 15 can perform a read or write operation resulting in one or more data requests to the data storage device 105.

It should be noted that although element 105 is illustrated as a single data storage device, such as a single data storage array, element 105 can also represent, for example, multiple data storage arrays alone, or in combination with, other data storage systems, systems, appliances, and/or components having suitable connectivity, such as in a SAN. It should also be noted that an embodiment can include data storage arrays or other components from one or more vendors. In subsequent examples illustrated the embodiments herein, reference can be made to a single data storage array by a vendor, such as by DELL Technologies of Hopkinton, Mass. However, as will be appreciated by those skilled in the art, the embodiments herein are applicable for use with other data storage arrays by other vendors and with other components than as described herein for purposes of example.

The data storage device 105 can be a data storage array including a plurality of data storage disks 16a-n. The data storage disks 16a-n can include one or more data storage types such as, for example, one or more disk drives and/or one or more solid state drives (SSDs). An SSD is a data storage device that uses solid-state memory to store persistent data. An SSD using SRAM or DRAM, rather than flash memory, can also be referred to as a RAM drive. SSD can refer to solid state electronics devices as distinguished from electromechanical devices, such as hard drives, having moving parts. Flash devices or flash memory based SSDs are types of SSD that do not include moving parts. In embodiments, one or more of the disks 16a-n can be flash drives or devices. In other embodiments, the disks 16a-n can be any type of SSD, flash device, or flash memory device.

The storage device 105 can also adapters or directors, such as an HA 21 (host adapter), RA 40 (remote adapter), and/or device interface 23. Each of the adapters HA 21, RA 40 can be implemented using hardware including a processor with local memory with code stored thereon for execution in connection with performing different operations. The HA 21 can be used to manage communications and data operations between one or more host systems 14a-n and a global memory (GM) 25b. In an embodiment, the HA 21 can be a Fibre Channel Adapter (FA) or another adapter which facilitates host communication. The HA 21 can be characterized as a front-end component of the data storage device 105 which receives a request from one or more of the hosts 14a-n. The storage device 105 can also include one or more RAs (e.g., RA 40) that can be used, for example, to facilitate communications between data storage arrays (e.g., between the storage array 12 and the external storage system(s)). The storage device 105 can also include one or more device interfaces 23 for facilitating data transfers to/from the data storage disks 16a-n. The data storage interfaces 23 can include device interface modules, for example, one or more disk adapters (DAs) 30 (e.g., disk controllers), flash drive interface 35, and the like. The DA 30 can be characterized as a backend component of the data storage device 105 which interfaces with the physical data storage disks 16a-n.

In embodiments, the storage device 105 can include one or more internal logical communication paths (not shown) between the device interfaces 23, the RAs 40, the HAs 21, and the memory 26. The communication paths can include internal busses and/or communication modules. For example, the global memory 25b can use the communication paths to transfer data and/or send other communications between the device interfaces 23, HAs 21 and/or RAs 40 in a data storage array. In an embodiment, the device interfaces 23 can perform data operations using a cache that can be included in the global memory 25b, for example, when communicating with other device interfaces and other components of the data storage array. The other portion 25a is that portion of memory that can be used in connection with other designations that can vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, can also be included in an embodiment.

Host systems 14a-n provide data and access control information through channels to the storage device 105. and the storage device 105 can also provide data to the host systems 14a-n also through the channels. The storage device 105 does not allow the host systems 14a-n do not address the drives or disks 16a-n of the storage systems directly, but rather provides the host systems 14a-n with logical devices or logical volumes (LVs). The LVs do not need to correspond to the actual physical devices or drives 16a-n. For example, one or more LVs can reside on a single physical drive or multiple drives. Data in a single data storage system, such as a single storage device 105, can be accessed by multiple hosts allowing the hosts to share the data residing therein. The HA 21 can be used in connection with communications between a storage device 105 and one or more of the host systems 14a-n. The RA 40 can be configured to facilitate communications between two or more data storage arrays (e.g., device 12 and external device(s) 105). The DA 30 can be one type of device interface used in connection with facilitating data transfers to/from the associated disk drive(s) 16a-n and LV(s) residing thereon. A flash device interface 35 can be configured as a device interface for facilitating data transfers to/from flash devices and LV(s) residing thereon. It should be noted that an embodiment can use the same or a different device interface for one or more different types of devices than as described herein.

The device interface, such as a DA 30, performs I/O operations on a drive 16a-n. In the following description, data residing on an LV can be accessed by the device interface following a data request in connection with I/O operations that other directors originate. Data can be accessed by LV in which a single device interface manages data requests in connection with the different one or more LVs that can reside on a drive 16a-n. For example, a device interface can be a DA 30 that accomplishes the foregoing by creating job records for the different LVs associated with a device. These different job records can be associated with the different LVs in a data structure stored and managed by each device interface.

Figure 2:
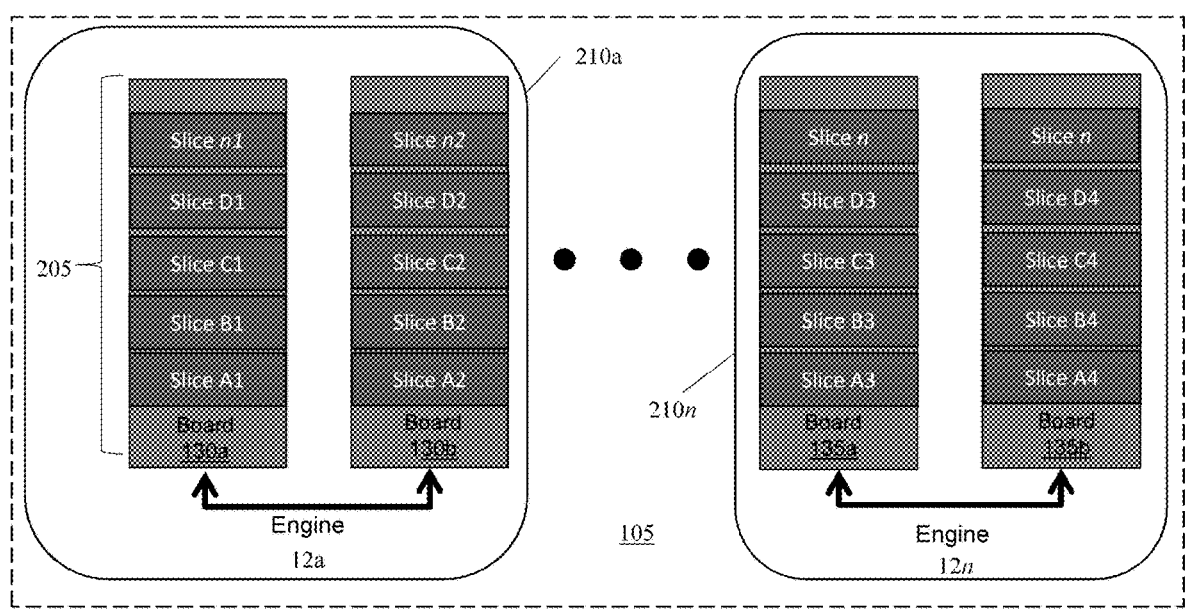
FIGS. 2-2A are block diagrams of engines of a storage device in accordance with example embodiments disclosed herein.
Figure 2A:
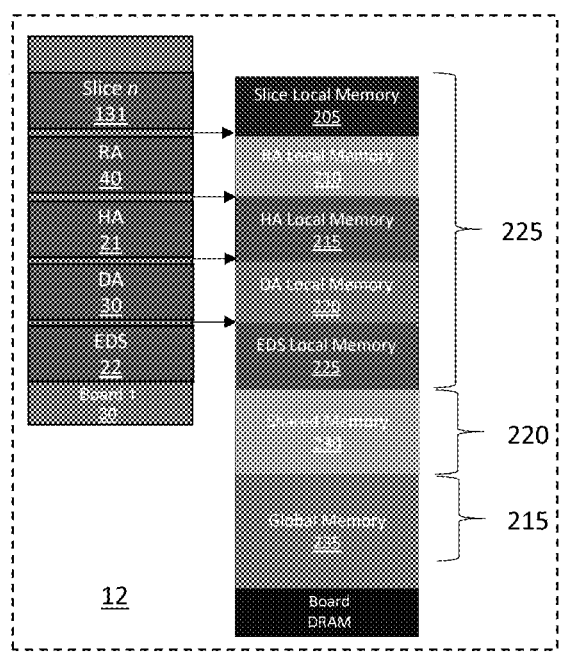

Referring to FIGS. 2-2A, the storage device 105 includes engines 12a-n configured to provide storage device services. Each of the engines 12a-n include hardware circuitry and/or software components required to perform the storage device services. Each engine 12a-n can be housed in a shelf (e.g., housing) 210a-n that interfaces with a cabinet and/or rack (not shown) of the storage device 105.

In embodiments, each engine 12a-n can include one or more boards 30. In the non-limiting example illustrated by FIG. 2, each engine 12a-n includes a pair of boards 130a-b, 135a-b. Each board 130a-b, 135a-b includes slice elements 205 comprising hardware and/or software elements of each of the boards 130a-b, 135a-b. Each board 130a-b, 135a-b can include slices (e.g. slices A1-n1, A2-n2, A3-n3, and A4-n4). Each slice A1-n1, A2-n2, A3-n3, and A4-n4 can correspond to one or more of the storage device components described in FIG. 1. In the non-limiting example illustrated by FIG. 2A, each slice corresponds to one of the EDS 22, DA 30, HA 21, and RA 30. In embodiments, a board 30 can include additional slices 131 that correspond to other known storage device components.

In embodiments, each board can include memory 200 (e.g., dynamic random-access memory (DRAM)). The slice controller 110 of FIG. 3 can subdivide the memory 200 into one or more portions (e.g., portions 215, 220, and 225). For example, the controller 110 can allocation a first portion 215 for global memory 235 of the storage device. As such, the global memory portion 235 can make up one or more portions of the storage device's total global memory 25b. In additional embodiments, the controller 110 can allocation a second portion 220 as shared memory 220. The slice controller 110 can enable access to the shared memory 230 by each of the slice elements 205. In further embodiments, the controller 110 can allocate a third portion 225 as local memory. For example, the controller 110 can subdivide the third portion 225 into one or more local memory elements 205-222. The controller 110 can further assign each of the slice elements 205 to one of the local memory elements 205-225. In the non-limiting example illustrated by FIG. 2A, the controller 110 assigns EDS local memory 225 for EDS; DA local memory 220 for DA 30, HA local memory 215 for HA 21; and RA local memory for RA 40.

Figure 3:
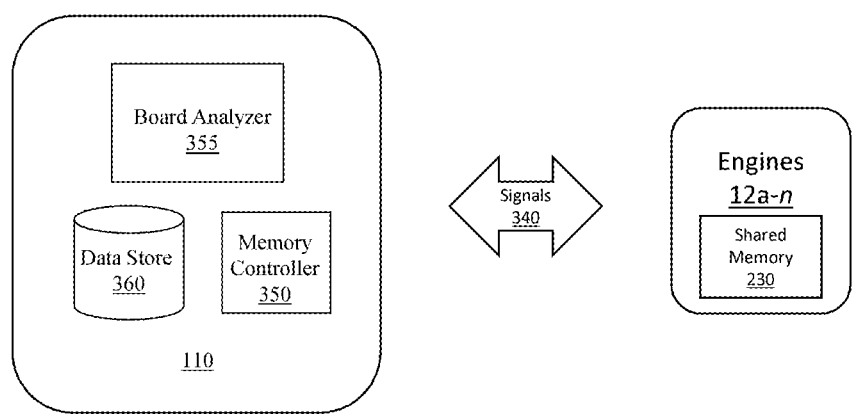
FIG. 3 illustrates a block diagram of a slice controller in accordance with example embodiments disclosed herein.

Referring to FIG. 3, the slice controller processor 110 can include elements 100 (e.g., software and hardware elements). In embodiments, the slice controller 110 can be any one of a variety of commercially available processors, such as an Intel-based processor, and the like. Although what is described herein shows the elements 100 residing in the slice controller 110, all or portions of the illustrated elements 100 may also reside elsewhere such as, for example, on HA 21 or any of the host systems 14a-n of FIG. 1. In other embodiments, the slice controller 110 can be a parallel processor such as a graphical processing unit (GPU).

In embodiments, the slice controller 110 can include a board analyzer 355. The analyzer 355 can collect data from the engines 12a-n and their components via, e.g., a Fibre channel or a network communication interface. The controller 110 can issue signals 340 that include pull messages and/or push messages. The pull messages can include instructions for the engines 12a-n to provide operational information to the controller 110. The operational information can include telemetry data such as bandwidth information, memory usage and capacity, and resource consumption, amongst other information that facilitates memory management of shared memory (e.g., shared memory 230 of FIG. 2A). The push messages can include instructions for memory access control, memory access scheduling, and memory access policies, amongst other information that facilitates memory management of shared memory.

In embodiments, the engines 12a-n can include one or more daemons communicatively coupled to and configured to monitor each slice 205. For example, the daemons can generate log files that record activities of each slice 205 and their respective local memories 225. Accordingly, the analyzer 355 can collect the data via one or more communication push and/or pull techniques to retrieve the log files generated by each daemon. The analyzer 355 can store the data in data store 360. In embodiments, the collected data can include real-time and/or historical storage device and engine parameters, configuration information, and telemetry data. For example, the collected data can include workload information, I/O types (e.g., read/write percentages), I/O sizes, activity types, and performance (e.g., response times), amongst other information.

In further embodiments, the analyzer 355 can monitor and analyze access requests for the shared memory 230 by each of the slices 205. Based on the analyze, the analyzer 355 can determine task types (e.g., operation types) associated with each request. Additionally, the analyzer 355 can determine which of the slices 430a-n issued each task type, e.g., via a source indicator including in each request. Using one or more machine learning techniques, the analyzer 355 can predict task types that each slice may issue at any time using historical and current task type determinations and source identifications.

Further, the analyzer 355 can generate shared task queues (e.g., shared queue 410 of FIG. 4) and associate each queue to distinct task type. The analyzer 355 can also establish a shared memory index for each shared queue. The shared memory indexes can include one or more index elements. Each index elements can reference a distinct buffer location corresponding to the shared queue associated with the shared memory index of the index element.

In embodiments, the controller 110 can include a memory controller 350. The memory controller 350 can be configured to control shared memory access requests issued by each of the slices 205 as described in greater detail with respect to FIG. 4.

Figure 4:
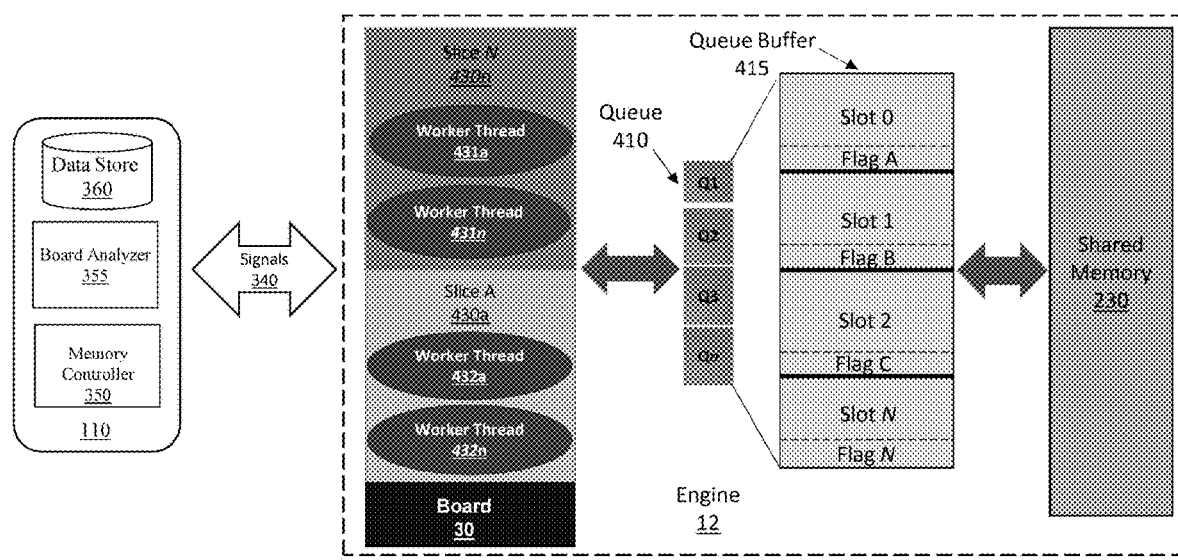
FIG. 4 illustrates a slice communication block diagram in accordance with example embodiments disclosed herein.

Referring to FIG. 4, the board analyzer 355 can configure a shared task queue 410 to buffer access requests associated with a distinct task type (e.g., read or write operation). For example, the analyzer 355 can establish and configure the task queue 410 to receive and buffer either read or write operations in its queue buffer 415. Further, the board analyzer 355 can monitor and retrieve state information from the shared task queue 410. For example, the state information can include a number of queued tasks, a status of each queued task, queue depth, buffer capacity, and shared memory index information, amongst other relevant information. The memory controller 350 can receive the state information from the analyzer 355 or retrieve the information from the data store 360. Using the state information, the memory controller 350 can manage and control the memory access requests issued by the worker threads 431a-n, 432a-n.

In embodiments, each of the slices 430a-n (e.g., slices 205 of FIG. 2) can establish one or more worker threads 431a-n, 432a-n. Each worker thread 431a-n, 432a-n can comprise one or more instructions for performing a distinct task (e.g., a read and/or write operation). Further, each worker thread 431a-n, 432a-n can issue memory access requests via a communication signal 410.

In embodiments, the memory controller 350 can be configured to direct each task operation within signal 410 to a queue (e.g., queue 410) based on each operation's task type. The memory access requests can include searchable metadata that includes a task type of the operation it contains. Accordingly, the memory controller 350 can determine each operation's task type from the request the is contained within. Based on the determined operation's task type, the memory controller 350 can direct the request to a queue configured to queue the determined task type. For example, the memory controller 350 can perform a lookup of a searchable data structure that maps task operations to queues. The data structure can be a lookup table amongst other known types of data structures configured to associate a first set of data with a second set of data.

In other embodiments, the memory controller 350 can be configured to determine status of a queue (e.g., queue 410) as described above. In response to determining the status of the queue 410, the memory controller 350 can generate instructions for each of the slices for issuing memory access requests. For example, the memory controller 350 can determine available index elements (e.g., elements Q1-$n$) of the queue 410. Further, the memory controller 350 can issue an update signal each of the slices 430a-n that can issue a task type corresponding to the task type of the queue 410. The update signal can include information related to available queue elements and scheduling instructions for selecting the queue 410 an available queue index element of the index elements Q1-$n$.

In response to receiving a task operation, the queue 410 determines an available buffer slot of buffer slots 0-N of queue buffer 415. In embodiments, the queue 410 can determine which of the buffer slots 0-N are open and buffer the task operation in the open buffer slot. In one example, the index elements of the queue's memory index can monitor the states of their respective referenced buffer slots 0-N. In the example illustrated, each of the buffer slots 0-N include respective flags A-N. Each of the flags A-N can provide an indication as to whether their respective buffer slots 0-N are open or in use. In response to being assigned one of the buffer slots 0-N, the operation task (e.g., one of the worker threads 431a-n, 432a-n can update the slot's flag from open to in use. Once the operation task had completed its programmed task, the task's thread can update the assigned buffer slot's flag from in use to open. In response to each flag change, the index element associated with the updated buffer slot provides an indication of whether its referenced buffer slot is open or in use.

In embodiments, the memory controller 350 can allocate one or more hardware and/or software resources to each of the buffer slots 0-N required for a task operation to perform is programmed task. In embodiments, the memory controller 350 can allocate the resources based on anticipated and/or current workloads experienced by the storage device 105. Accordingly, the queue 410 and its queue buffer 45 can provide an indication of a service level agreement (SLA) associated with a task operation received and/or buffered. As such, the memory controller 350 can allocate resources to those buffer slots that are buffering higher priority tasks.

The following text includes details of one or more methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Figure 5:
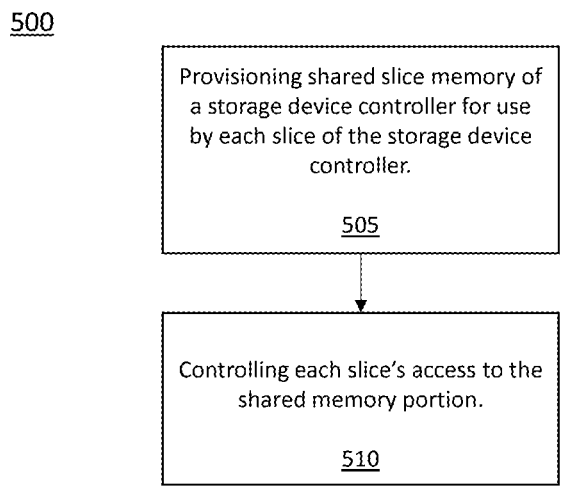
FIG. 5 is a flow diagram of a method for controlling slice memory in accordance with example embodiments disclosed herein.

Referring to FIG. 5, a method 500 can be executed by, e.g., a controller (e.g., the controller 110 of FIG. 1) and/or any element of device 105 of FIG. 1. The method 500 describes steps for managing communications between slices on a storage device engine. At 505, the method 500 can include provisioning shared slice memory of a storage device engine for use by each slice of the storage device engine (e.g., engines 12a-n of FIG. 2). The shared slice memory can be a portion of total storage device engine memory. The method 500, at 510, can also include dynamically controlling each slice's access to the shared memory portion. It should be noted that each step of the method 500 can include any combination of techniques implemented by the embodiments described herein.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD- ROM disks. The processor and the memory can be supplemented by, and/or incorporated in special purpose logic circuitry.

To provide for interaction with a user, the above described embodiments can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described embodiments can be implemented in a distributed computing system that includes a backend component. The backend component can, for example, be a data server, a middleware component, and/or an application server. The above described embodiments can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A method comprising:
provisioning shared slice memory for a director board of a pair of director boards corresponding to a storage array's storage device engine for use by each slice of the director board, wherein the shared slice memory is a portion of total director board memory that includes dynamic random-access memory (DRAM) and wherein the storage device engine is housed in a shelf that interfaces with a cabinet and/or rack of a storage array;
determining task types related to each activity performed by each worker thread of each slice, wherein determining the task types includes identifying a source identification in each slice-issued shared memory access request;
correlating each slice's shared memory access requests with each task type; and
controlling each slice's access to the shared memory portion based on the correlation.

2. The method of claim 1 further comprising provisioning local slice memory portions of the total director board memory for each slice.

3. The method of claim 2 further comprising assigning each local slice memory portion to a distinct slice of the director board.

4. The method of claim 1 further comprising establishing one or more shared queues from the shared slice memory.

5. The method of claim 4, further comprising configuring each shared queue to buffer memory access requests from each slice.

6. The method of claim 4 further comprising associating each shared queue with one or more operation types.

7. The method of claim 4 further comprising configuring a shared memory index for each shared queue.

8. The method of claim 7 further comprising establishing an index element in the shared memory index to reference a buffer location corresponding to the shared queue for which the shared memory index is established.

9. The method of claim 8 further comprising:
monitoring a state of each shared memory index; and
directing each memory access request to a shared queue based on one or more of the states of each shared memory index and an operation type of the memory access request;
buffering each memory access request in the shared queue to which each memory access request is directed.

10. The method of claim 9 further comprising:
updating the states of each shared memory index to which each memory access request is directed; and
providing the states of each shared memory index to each slice.

11. An apparatus comprising a memory and at least one processor configured to:
provision shared slice memory for a director board of a pair of director boards corresponding to a storage array's storage device engine for use by each slice of the director board, wherein the shared slice memory is a portion of total director board memory that includes dynamic random-access memory (DRAM) and wherein the storage device engine is housed in a shelf that interfaces with a cabinet and/or rack of a storage array;
determine task types related to each activity performed by each worker thread of each slice, wherein determining the task types includes identifying a source identification in each slice-issued shared memory access request;
correlate each slice's shared memory access requests with each task type; and
control each slice's access to the shared memory portion based on the correlation.

12. The apparatus of claim 11 further configured to provision local slice memory portions of the total director board memory for each slice.

13. The apparatus of claim 12 further configured to assign each local slice memory portion to a distinct slice of the director board.

14. The apparatus of claim 11 further configured to establish one or more shared queues from the shared slice memory.

15. The apparatus of claim 14, further configured to configure each shared queue to buffer memory access requests from each slice.

16. The apparatus of claim 14 further configured to associate each shared queue with one or more operation types.

17. The apparatus of claim 14 further configured to configure a shared memory index for each shared queue.

18. The apparatus of claim 17 further configured to establish an index element in the shared memory index to reference a buffer location corresponding to the shared queue for which the shared memory index is established.

19. The apparatus of claim 18 further configured to:
monitor a state of each shared memory index; and
direct each memory access request to a shared queue based on one or more of the states of each shared memory index and an operation type of the memory access request;
buffer each memory access request in the shared queue to which each memory access request is directed.

20. The apparatus of claim 19 further configured to:
update the states of each shared memory index to which each memory access request is directed; and
provide the states of each shared memory index to each slice.

* * * * *